(12) United States Patent
Cornman et al.

(10) Patent No.: US 10,648,619 B1
(45) Date of Patent: May 12, 2020

(54) REFILLABLE GAS TANK WITH PNEUMATIC VALVE CONTROLLER

(71) Applicant: United States of America as Represented by the Secretary of the Navy, Arlington, VA (US)

(72) Inventors: Jacob K. Cornman, Panama City, FL (US); Brian W. Toole, Panama City, FL (US); Kirk W. Vanzandt, Panama City, FL (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 20 days.

(21) Appl. No.: 16/123,050

(22) Filed: Sep. 6, 2018

(51) Int. Cl.
*F17C 1/00* (2006.01)
*F17C 5/06* (2006.01)
*F17C 5/00* (2006.01)
*F17C 13/04* (2006.01)
*F16K 15/06* (2006.01)

(52) U.S. Cl.
CPC .............. *F17C 5/06* (2013.01); *F17C 5/007* (2013.01); *F17C 13/04* (2013.01); *F16K 15/063* (2013.01); *F17C 2205/0335* (2013.01); *F17C 2205/0388* (2013.01); *F17C 2221/011* (2013.01); *F17C 2227/04* (2013.01); *F17C 2270/025* (2013.01)

(58) Field of Classification Search
CPC .. F17C 5/007; F17C 13/04; F17C 6/00; F17C 2205/0335; F17C 2205/0388; F17C 2221/011; F16K 15/063
USPC .................................................. 137/517, 540
See application file for complete search history.

(56) References Cited

U.S. PATENT DOCUMENTS

2019/0107254 A1* 4/2019 Rigdon ................... F17C 13/04

* cited by examiner

*Primary Examiner* — P. Macade Nichols
(74) *Attorney, Agent, or Firm* — James T. Shepherd

(57) ABSTRACT

A pneumatic valve controller is provided for use with a refillable gas tank that has an inlet and an outlet with a spring-loaded valve disposed in the outlet. The spring-loaded valve is biased to define a flow path between an interior of the gas tank and the outlet. The controller's housing includes a cylinder with a gas filling port in fluid communication with a first axial end of the cylinder. The cylinder's second axial end is open and aligned with the spring-loaded valve. A piston is disposed in the cylinder. A check valve has an input and an output with the input in fluid communication with the gas filling port and the output in fluid communication with the inlet of the gas tank.

6 Claims, 3 Drawing Sheets

REFILLABLE GAS TANK WITH PNEUMATIC VALVE CONTROLLER

ORIGIN OF THE INVENTION

The invention described herein may be manufactured and used by or for the Government of the United States of America for Governmental purposes without payment of any royalties.

FIELD OF THE INVENTION

The invention relates generally to valve controls, and more particularly to a pneumatic valve controller for a refillable gas tank.

BACKGROUND OF THE INVENTION

Refillable gas tanks (e.g., oxygen tanks) typically have a valve integrated therein with an inlet through which they are filled with a gas and an outlet through which the gas is dispensed. Such valves are generally positioned or biased (e.g., using a spring) into an open position. However, when the gas tank needs to be refilled, the valve must be closed or sealed to prevent recharging gas from leaking from the tank. Currently, the valve is manually manipulated or temporarily removed and replaced with an outlet seal. Manual manipulation of the valve requires additional time and care, while replacing the valve with a seal exposes the tank to environmental contaminants that can be of great concern in the case of oxygen tanks or tanks that contain breathing gasses. Additionally, certain applications do not permit manual manipulation of cylinder valves thereby necessitating some other process to re-seat the valve.

SUMMARY OF THE INVENTION

Accordingly, it is an object of the present invention to provide a valve controller that automatically controls a gas tank's outlet valve during the refilling of the gas tank.

Another object of the present invention is to provide a valve controller that can be integrated with a new or existing gas tank valve for automatically positioning the gas tank's valve in a sealed position when the gas tank is being refilled or recharged.

Other objects and advantages of the present invention will become more obvious hereinafter in the specification and drawings.

In accordance with the present invention, a pneumatic valve controller is provided for use with a refillable gas tank that has an inlet and an outlet with a spring-loaded valve disposed in the outlet. The spring-loaded valve is biased to define a flow path between an interior of the gas tank and the outlet. The pneumatic valve controller includes a housing having a cylinder defined therein. The housing has a gas filling port in fluid communication with a first axial end of the cylinder. The cylinder has a second axial end that is open and aligned with the spring-loaded valve. A piston is slidingly disposed in the cylinder and in a sealed fluid communication therewith. A check valve has an input and an output with the input in fluid communication with the gas filling port and the output in fluid communication with the inlet of the gas tank. The check valve is configured to open when gas pressure at its input is greater than gas pressure at its output.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
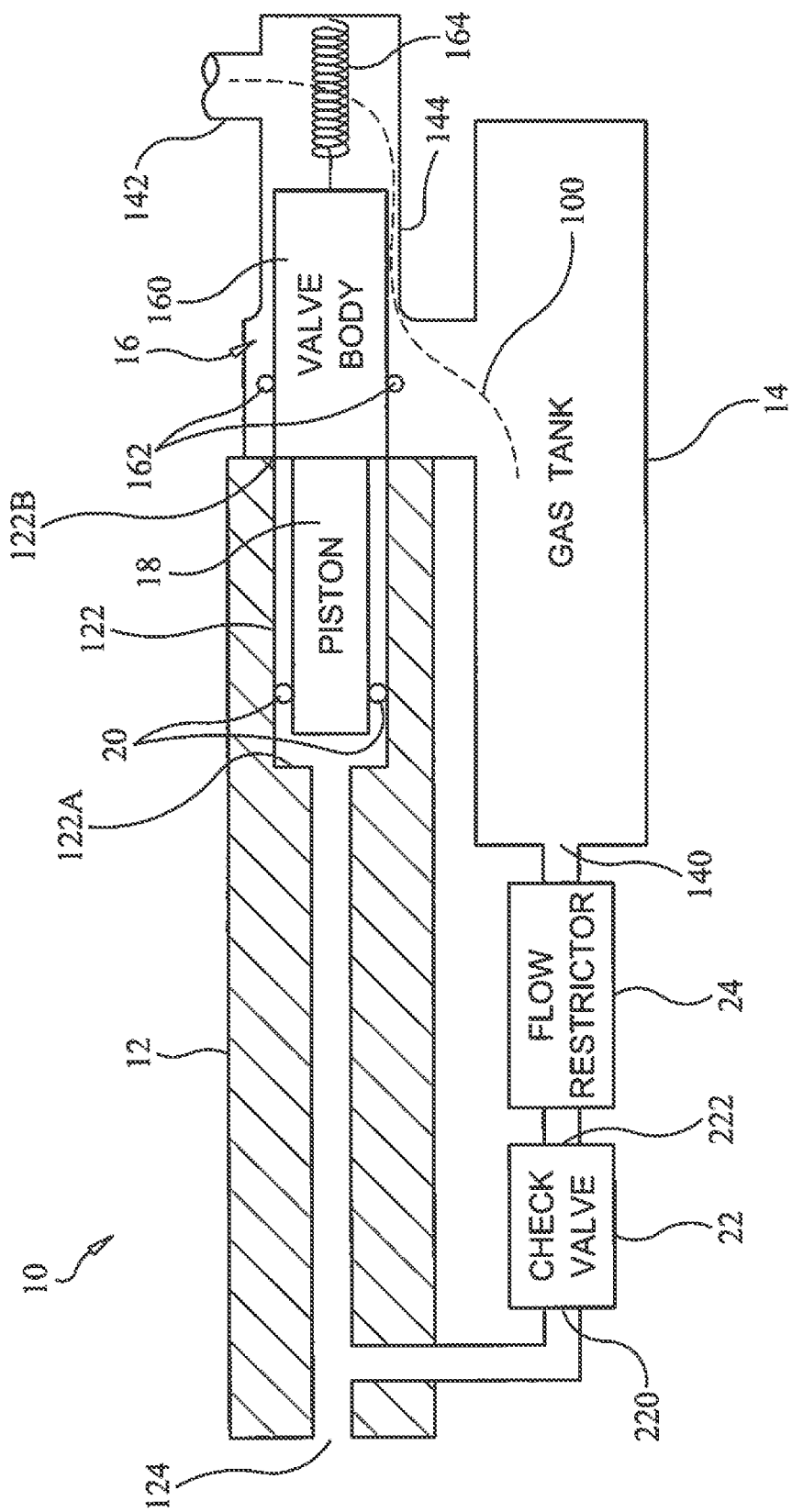
FIG. 1 is a schematic view of a refillable gas tank having a pneumatic valve controller in accordance with an embodiment of the present invention with the valve controller and the tank's valve being illustrated prior to a gas charging operation.

Referring now to the drawings and more particularly to FIG. 1, a schematic view of a refillable gas tank having a pneumatic valve controller in accordance with an embodiment of the present invention is referenced generally by numeral 10 and will be referred to hereinafter as tank/controller 10. It is to be understood that the type of gas stored by tank/controller 10 is not a limitation of the present invention. By way of an illustrative example, the present invention will be described for use with refillable oxygen tanks where it is desirable to keep the tank valve closed at all times, to include during refilling or recharging operations, in order to prevent contamination of the tank and its gas contents.

Tank/controller 10 includes a housing 12 that supports some or all of the various elements of the present invention. It is to be understood that the shape and size of housing 12, as well as the number and choice of elements that it supports, are not limitations of the present invention. Coupled to or incorporated into housing 12 is a gas tank 14 that is used to store a pressurized gas (e.g., oxygen) therein. Tank 14 has an inlet 140 for receiving gas during a refilling or recharging operation. Tank 14 also has an outlet 142 through which stored gas is dispensed. For example, a regulator (not shown) would typically be coupled to outlet 142 when tank 14 is used to store/dispense oxygen.

Disposed between inlet 140 and outlet 142 is a valve 16 that is biased to be in a normally open position such that a gas flow path is enabled from the interior volume of tank 14 to outlet 142 as illustrated by dashed-line 100. By way of an illustrative example, valve 16 includes a valve body 160, a seal 162 disposed annularly about valve body 160, and spring 164 positioned between valve body 160 and a portion of tank 14. Valve body 160 is disposed in a valve seat 144 of tank 14. In the normally open position illustrated in FIG. 1, spring 164 biases valve body 160 such that seal 162 does not reside in valve seat 144 thereby providing for the above-described flow path 100.

In accordance with the present invention, a cylinder 122 is defined in housing 12 and is positioned in axial alignment with valve body 160 for reasons that will be explained further below. One axial end 122A of cylinder 122 is in fluid communication with a gas fill port 124 provided in housing 12. The other axial end 122B of cylinder 122 is open for exposure to and in alignment with valve body 160. A piston 18 (e.g., a barrel piston) is disposed in cylinder 122 for sliding movement therein while providing a gas seal therewith. The gas seal can be provided by one or more seals represented by an o-ring seal 20 disposed about piston 18 and engaged with the walls of cylinder 122. In the pre-charging state illustrated in FIG. 1, piston 18 can be in contact with valve body 160 but has no effect on the biasing force provided by spring 164 that keeps valve 16 open to flow path 100.

A check valve 22 and flow restrictor 24 are disposed in line with one another between gas fill port 124 and inlet 140 of tank 14. More specifically, check valve 22 is configured to be open when (gas) pressure at its input side 220, in fluid communication with gas fill port 124, is greater than at its output side 222. Flow restrictor 24 is disposed between the output side 222 of check valve 22 and the inlet 140 of gas tank 14 to create or increase a pressure differential during gas flow conditions where such pressure differential causes movement of piston 18 as will be described further below. If a sufficient pressure differential can be created/generated by check valve 22, flow restrictor 24 can be omitted.

Figure 2:
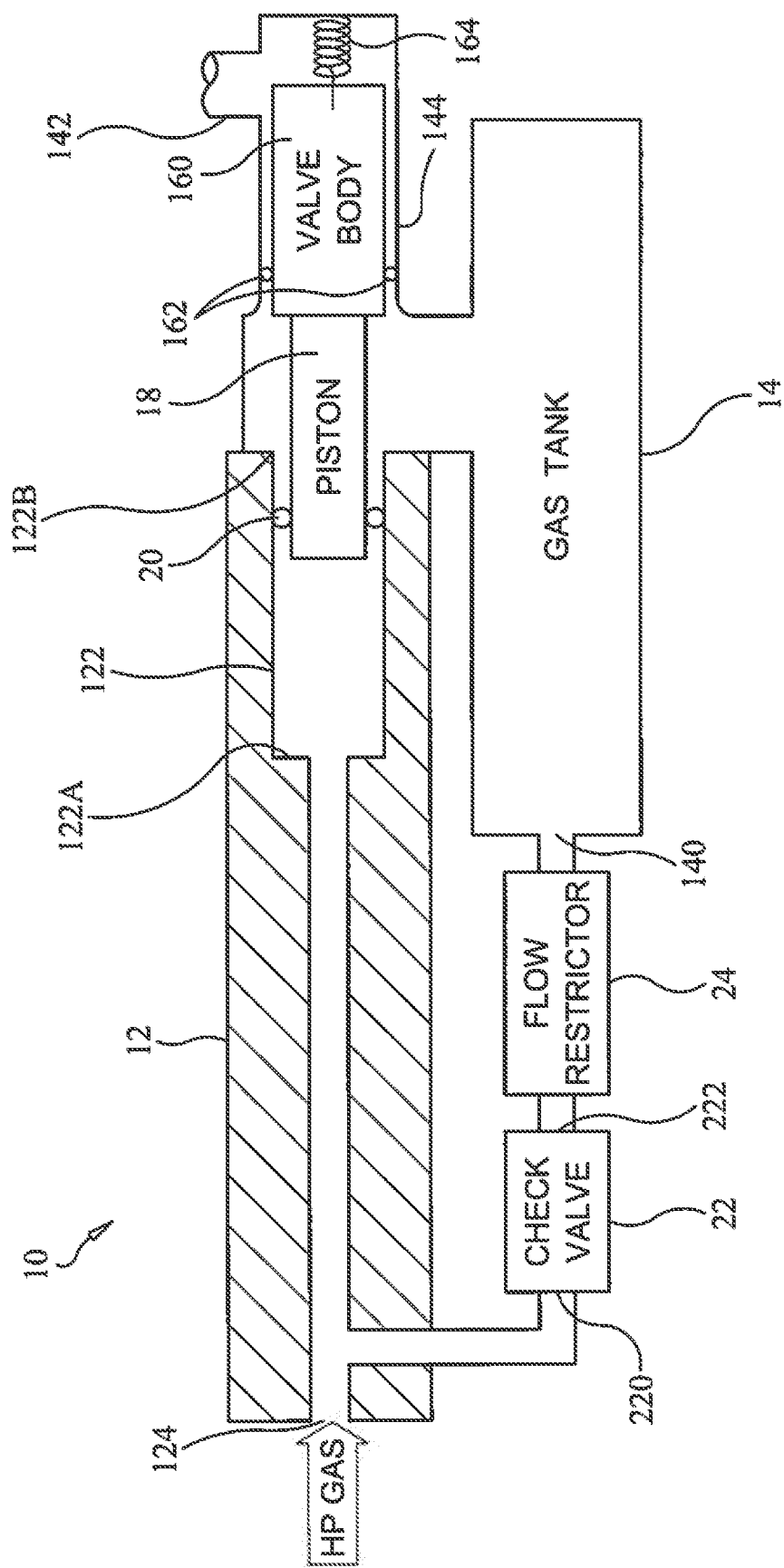
FIG. 2 is a schematic view of the refillable gas tank and pneumatic valve controller with the valve controller and the tank's valve being illustrated during a gas charging operation.
Figure 3:
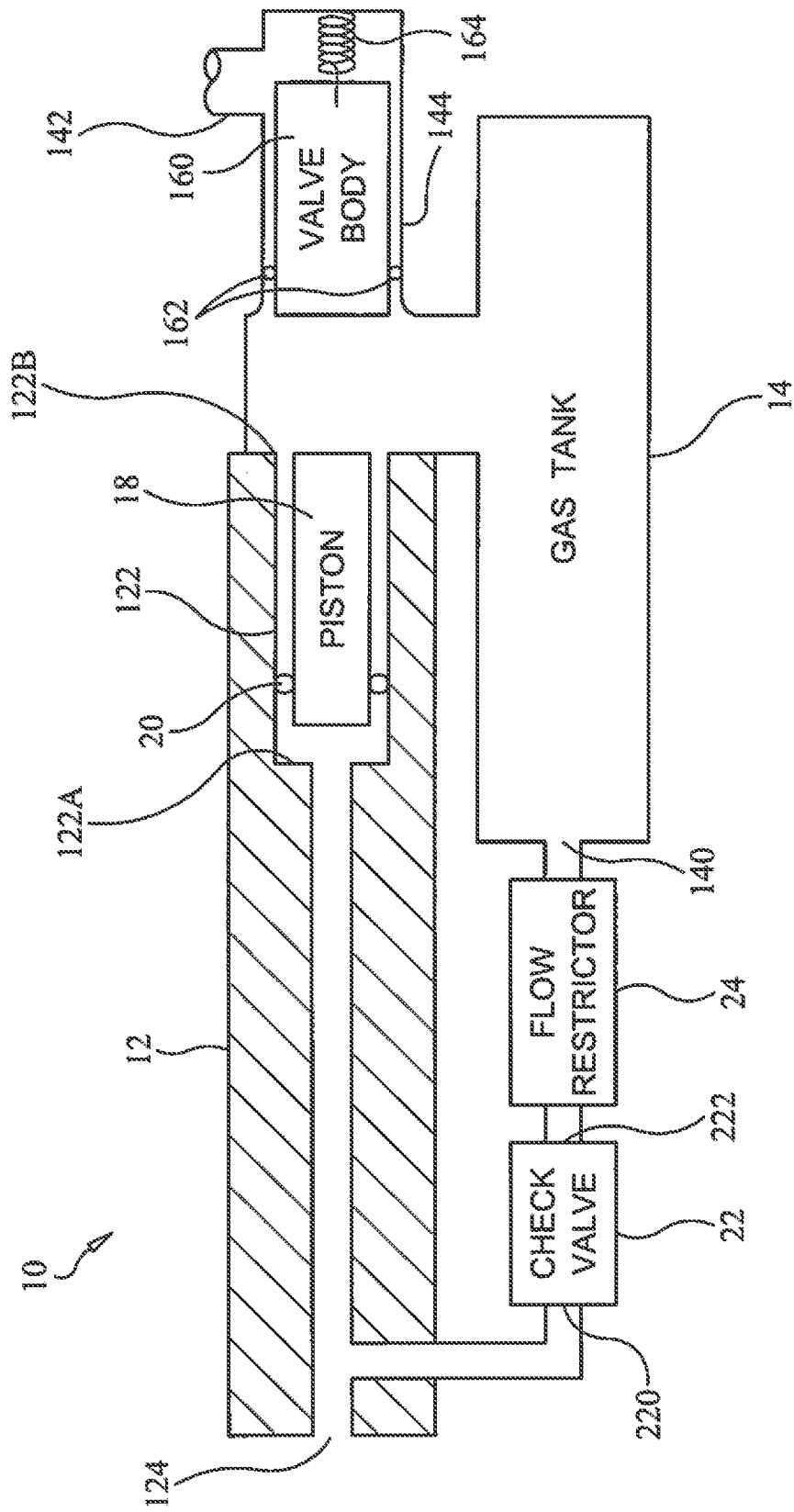
FIG. 3 is a schematic view of the refillable gas tank and pneumatic valve controller with the valve controller and the tank's valve being illustrated after the completion of the gas charging operation.

With reference now to FIGS. 2 and 3, the charging and post-charging configuration, respectively, of tank/controller 10 will be explained. When a high-pressure charging gas ("HP GAS") is supplied to gas fill port 124, the high-pressure charging gas is supplied to axial end 122A of cylinder 122 and the input side 220 of check valve 22. When this occurs, the high-pressure charging gas causes check valve 22 to open thereby allowing the high-pressure charging gas to flow through flow restrictor 24 (if present/needed) and into tank 14, and generate the pressure differential from the input of flow restrictor 24 to the output of flow restrictor 24. Simultaneously, the pressure differential causes piston 18 to be driven against valve body 160 to thereby position seal 162 in valve seat 144 and seal tank outlet 142 as shown in FIG. 2.

Upon completion of the refill or recharge operation, the high-pressure charging gas is removed from gas fill port 124. When this occurs, check valve 22 will close owing to the lower pressure at its input side 220 as compared to its output side 222.

Simultaneously, the high-pressure charging gas is removed from the axial end 122A of cylinder 122 thereby allowing piston 18 to move away from its engagement with valve body 160. However, since the pressure in gas tank 14 is high owing to the charging pressure, valve body 160 is still being acted upon by high pressure to thereby overcome the opening bias force provided by spring 164, thereby keeping valve body 160 and valve seal 162 in their sealing relationship with valve seat 144 as shown in FIG. 3.

The advantages of the present invention are numerous. The pneumatic valve controller automatically positions a gas tank's normally open valve in a sealed position during a gas refilling operation. The controller automatically keeps the tank's valve in its closed and sealed position after the gas recharging operation is complete. The present invention eliminates the need for any manual sealing operation, while guaranteeing a contaminant-free recharging operation.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

The invention claimed is:

1. A pneumatic valve controller for a refillable gas tank having an inlet and an outlet with a spring-loaded valve disposed in the outlet and biased to define a flow path between an interior of the gas tank and the outlet, said pneumatic controller comprising:
    a housing having a cylinder defined therein, said housing having a gas filling port in fluid communication with a first axial end of said cylinder, said cylinder having a second axial end that is open and adapted to be aligned with the spring-loaded valve;
    a piston slidingly disposed in said cylinder and in a sealed fluid communication therewith;
    a check valve having an input and an output, said input in fluid communication with said gas filling port, said output adapted to be in fluid communication with the inlet of the gas tank, said check valve opening when gas pressure at said input is greater than gas pressure at said output; and
    a flow restrictor in fluid communication with said output of said check valve and adapted to be in fluid communication with the inlet of the gas tank, wherein a pressure differential is generated under gas flow conditions.

2. A pneumatic valve controller as in claim 1, wherein said piston comprises a barrel-shaped piston.

3. A refillable gas tank that is automatically sealed during a refilling operation, comprising:
    a gas tank having an inlet and an outlet, and having an interior volume defined between said inlet and said outlet;
    a spring-loaded valve disposed in said outlet of said gas tank, said spring-loaded valve biased to define a flow path between said interior volume of said gas tank and said outlet;
    a housing having a cylinder defined therein, said housing having a gas filling port in fluid communication with a first axial end of said cylinder, said cylinder having a second axial end that is open and aligned with said spring-loaded valve;
    a piston slidingly disposed in said cylinder and in a sealed fluid communication therewith;
    a check valve having an input and an output, said input in fluid communication with said gas filling port and said output in fluid communication with said inlet of said as tank, said check valve opening when gas pressure at said input is greater than gas pressure at said output; and
    flow restrictor in fluid communication with said output of said check valve and in fluid communication with said inlet of said gas tank, wherein a pressure differential is generated under gas flow conditions.

4. A refillable gas tank as in claim 3, wherein said piston comprises a barrel-shaped piston.

5. A refillable gas tank that is automatically sealed during a refilling operation, comprising:
    a gas tank having an inlet and an outlet, and having an interior volume defined between said inlet and said outlet;
    a spring-loaded valve disposed in said outlet of said gas tank, said spring-loaded valve having an axial arrangement of a valve body and a spring wherein said spring provides a spring force that biases said valve body to a first position that defines a flow path between said interior volume of said gas tank and said outlet;
    a housing having a cylinder defined therein in axial alignment with said valve body and said spring, said housing having a gas filling port in fluid communication with a first axial end of said cylinder, said cylinder having a second axial end that is open and adjacent to said valve body;

a piston slidingly disposed in said cylinder and in a sealed fluid communication therewith wherein, when a high-adapted to said gas filling port, said piston slides in said cylinder to bear against said valve body and apply a pressure force thereto that overcomes said spring force wherein said valve body is moved to a second position that blocks said flow path between said interior volume of said gas tank and said outlet;

a check valve having an input and an output, said input in fluid communication with said gas filling port and said output in fluid communication with said inlet of said gas tank, said check valve opening when the high-pressure gas is supplied to said gas filling port; and flow restrictor in fluid communication with said output of said check valve and in fluid communication with said inlet of said gas tank, wherein a pressure differential is generated under gas flow conditions.

6. A refillable gas tank as in claim 5, wherein said piston comprises a barrel-shaped piston.

\* \* \* \* \*